(12) United States Patent
Frank et al.

(10) Patent No.: US 6,931,850 B2
(45) Date of Patent: Aug. 23, 2005

(54) EXHAUST GAS DRIVEN GENERATION OF ELECTRIC POWER AND ALTITUDE COMPENSATION IN VEHICLES INCLUDING HYBRID ELECTRIC VEHICLES

(75) Inventors: Andrew A. Frank, Davis, CA (US); Thomas E. Darlington, West Sacramento, CA (US)

(73) Assignee: The Regents of the Univesity of California, Oakland, CA (US)

( * ) Notice: Subject to any disclaimer, the term of this patent is extended or adjusted under 35 U.S.C. 154(b) by 0 days.

(21) Appl. No.: 10/660,371

(22) Filed: Sep. 10, 2003

(65) Prior Publication Data

US 2005/0050887 A1 Mar. 10, 2005

(51) Int. Cl.[7] .......................... F02B 33/44; F02B 41/10; F02B 37/10
(52) U.S. Cl. .............................. 60/608; 60/607; 60/597
(58) Field of Search .......................... 60/608, 607, 597; 290/45, 52

(56) References Cited

U.S. PATENT DOCUMENTS

| | | | | |
|---|---|---|---|---|
| 4,757,686 A | * | 7/1988 | Kawamura et al. | 60/608 |
| 4,805,409 A | * | 2/1989 | Kobayashi | 60/597 |
| 4,850,193 A | * | 7/1989 | Kawamura | 60/608 |
| 5,400,596 A | * | 3/1995 | Shlien | 60/597 |
| 5,406,797 A | * | 4/1995 | Kawamura | 60/608 |
| 5,828,137 A | * | 10/1998 | Selfors et al. | 60/608 |
| 5,881,559 A | * | 3/1999 | Kawamura | 60/597 |
| 6,659,212 B2 | * | 12/2003 | Geisse et al. | 60/608 |
| 2001/0039230 A1 | * | 11/2001 | Severinsky et al. | 477/3 |

FOREIGN PATENT DOCUMENTS

| | | | | | |
|---|---|---|---|---|---|
| DE | 196 00 252 A | * | 7/1997 | | F02B/41/10 |
| JP | 06317169 A | * | 11/1994 | | F02B/37/10 |

* cited by examiner

Primary Examiner—Thai-Ba Trieu
(74) Attorney, Agent, or Firm—John P. O'Banion

(57) ABSTRACT

A hybrid electric vehicle includes an internal combustion engine, an electric motor and a transmission. A turbocharger is in fluid communication with the internal combustion engine. Moreover, a generator is mechanically coupled to the turbocharger and thereby driven by exhaust gas from the internal combustion engine. The generator can provide electricity to the motor and/or a battery while simultaneously providing altitude compensation for the internal combustion engine so that the internal combustion engine output remains at the same power and efficiency as altitude and environmental conditions change. The turbocharger can also be used for power boost if desired. The exhaust gas driven generator system can be deployed in conventional vehicles as well to charge the battery and/or power electrical accessories, thereby replacing the alternator.

43 Claims, 11 Drawing Sheets

EXHAUST GAS DRIVEN GENERATION OF ELECTRIC POWER AND ALTITUDE COMPENSATION IN VEHICLES INCLUDING HYBRID ELECTRIC VEHICLES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to internal combustion engine-driven vehicles, and more particularly to hybrid electric vehicles which are modified to incorporate a turbocharger and an exhaust gas driven generator.

2. Description of Related Art

A typical hybrid electric vehicle (HEV) combines an internal combustion engine (ICE) with an electric motor (EM) that is coupled to a battery power source. HEVs generally offer higher fuel economy, extended range, and lower emissions than conventional vehicles. Additionally, the inherent flexibility of HEVs can allow them to be used in a wide range of applications, from personal transportation to commercial hauling.

HEV powertrain theory has been in development for many years, with the greatest interest typically occurring when oil availability decreases and gasoline prices increase. The interest is due to the documented ability of HEVs to obtain significantly improved fuel economy and relatively low cost per mile of operation. Unfortunately, present HEVs are incapable of meeting the performance of conventional vehicles driven by ICEs at elevations higher than sea level. This shortcoming of HEVs is largely due to the fact that a typical HEV uses an ICE that is reduced in size compared to the conventional automobile and the reduced size of the ICE amplifies the effects of altitude changes on the performance of the ICE.

BRIEF SUMMARY OF THE INVENTION

In accordance with an aspect of the present invention, the reduced performance of HEVs at elevations higher than sea level is addressed by the use of a standard turbocharger in combination with the ICE. Note, however, that approximately eighty to ninety percent (80% to 90%) of a typical vehicle's operation is at altitudes where full boost from the turbocharger is not needed to maintain performance characteristics comparable to conventional vehicles of the same size. Therefore, according to another aspect of the invention, the turbocharger is used to drive an electric generator so that the power produced by the turbine section that is not needed to produce boost in the compressor section of the turbocharger is used for charging the batteries in the HEV. It will be appreciated that the amount of boost required, and the extent that boost is not needed at any particular time during operation of the vehicle, would be determined by parameters set by the vehicle designer and be dependent upon intended vehicle operation.

Another aspect of the invention is to use an exhaust gas driven generator (EGDG) to generate electric power for charging the batteries in the HEV. An EGDG configuration is advantageous in that thermal energy normally wasted through the exhaust of the ICE can be converted into electrical energy. By incorporating a turbocharger into the HEV and connecting the shaft of the generator to the turbocharger, the electric generator becomes an exhaust gas driven generator. By recovering a portion of the heat energy of the exhausted combustion gases and using it to drive the generator, the EGDG configuration can improve the volumetric efficiency and effective thermal efficiency of the propulsion system of the HEV, thus reducing the fuel consumption of a typical HEV even further.

In one embodiment of the invention, an HEV includes an internal combustion engine, a traction motor and a traction battery. It will be appreciated that the terms traction motor and traction battery are used in the art to describe the electric motor and battery, respectively, in an HEV and do not denote a particular type of electric motor or battery. The HEV further includes a turbocharger with a turbine section that is in fluid communication with the exhaust manifold of the internal combustion engine and a compressor section that is in fluid communication with the intake manifold of the internal combustion engine. Also, an electric generator is mechanically coupled to the turbocharger, such as either the shaft of the turbine or the compressor. In this way, the generator is driven by exhaust gas from the internal combustion engine. Preferably, the turbocharger includes a drive shaft and the generator is mechanically coupled to the drive shaft. The generator provides electric power to the traction motor and or the traction battery. In a preferred embodiment, the turbocharger has an unrestricted pressure ratio of approximately two-to-one (2:1). Moreover, at all altitudes the turbocharger has an outlet pressure of 1.1 atmospheres by regulation of the turbocharger speed with the generator.

In another embodiment, a hybrid electric vehicle includes an internal combustion engine, a traction motor and a traction battery. The hybrid electric vehicle further includes means for selectively providing increased power to the internal combustion engine. Moreover, the hybrid electric vehicle also includes means for generating electricity coupled to the means for selectively providing increased power to the internal combustion engine.

A still further aspect of the invention is a method of operation for a hybrid electric vehicle. The method includes selectively providing a power increase from a turbocharger. Additionally, the method includes selectively generating electricity using the exhaust gas driven generator.

In one embodiment, a method is provided for powering a hybrid electric vehicle that includes an internal combustion engine, a traction motor, and a traction battery. The method includes providing a turbocharger in fluid communication with the internal combustion engine. A generator is provided and is coupled to the turbocharger, thereby creating an exhaust gas driven generator. Further, electricity is selectively provided from the generator to the traction motor or the traction battery.

It will be appreciated that the present invention can be embodied in other ways as well. For example, in one embodiment, the turbine and compressor in the turbocharger are not on a common shaft. Therefore, the turbine does not drive the compressor. In this embodiment, the compressor is driven by an electric motor which is in turn powered by the batteries and/or the exhaust gas driven generator.

The invention also has application in conventional internal combustion engine driven vehicles (i.e., non-HEV) which do not employ an electric motor. In one embodiment, the vehicle is modified to include an exhaust gas driven generator wherein the exhaust gas driven generator comprises a turbine and an electric generator. The turbine is driven from exhaust gas from the exhaust manifold and, in turn, drives the generator. Note that this configuration can be used to charge the battery and/or power the electrical accessories in the vehicle and, therefore, can serve as a replacement for the vehicle's alternator. In another embodiment, the vehicle includes or is modified to include a turbocharger, and the electric generator is driven by the turbocharger in the same manner as described above in connection with an HEV. Again, however, this configuration can serve as a replacement for the vehicle's alternator.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and methodology generally shown and described in FIG. 1 through FIG. 11. It will be appreciated that the apparatus may vary as to configuration and as to details of the parts, and that the method may vary as to the specific steps and sequence, without departing from the basic concepts as disclosed herein.

Figure 1:
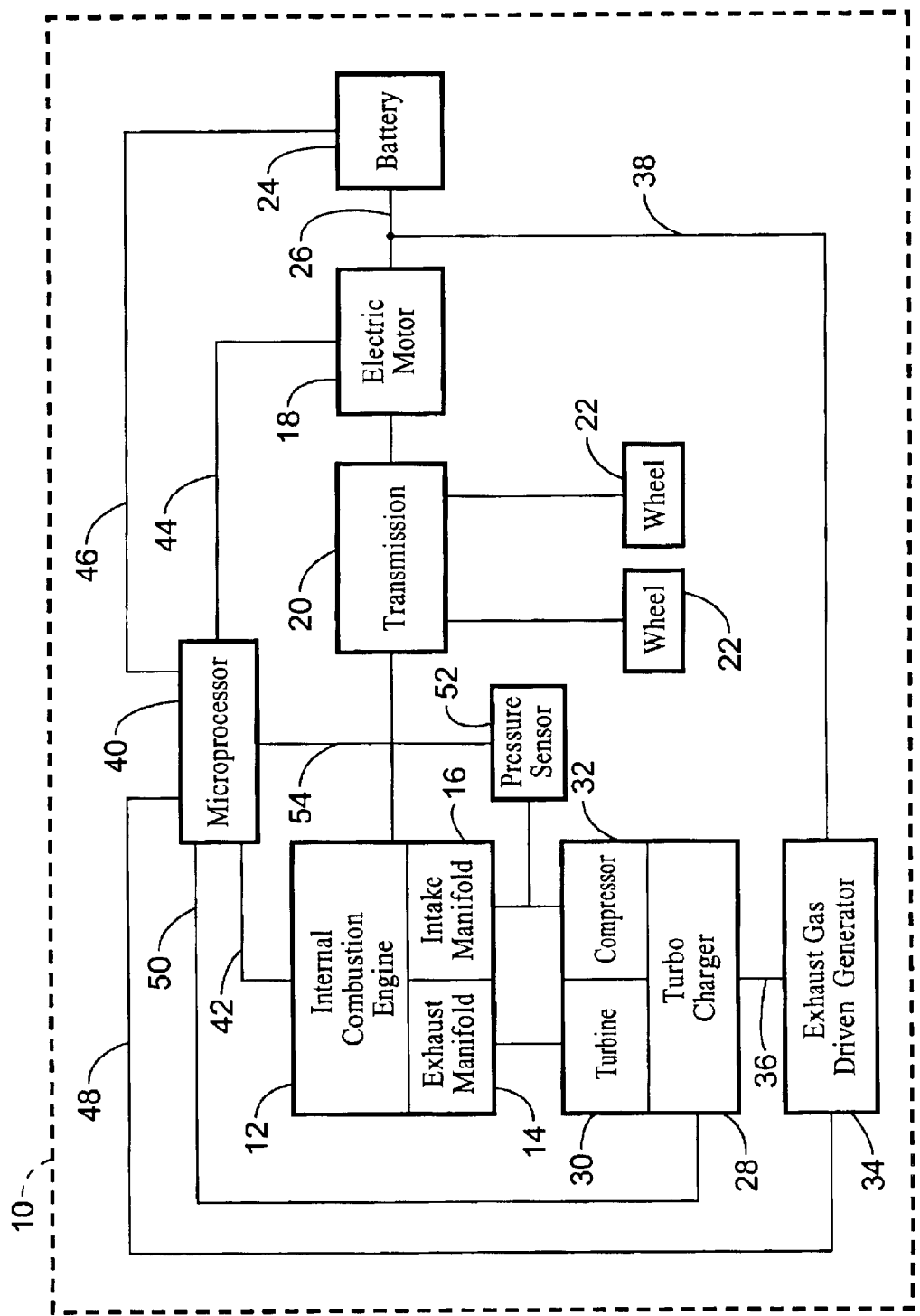
FIG. 1 is a block diagram of a hybrid electric vehicle according to the present invention.

Referring initially to FIG. 1, an embodiment of a hybrid electric vehicle (HEV) according to the present invention is shown and is generally designated 10. As shown, the HEV 10 includes an internal combustion engine (ICE) 12 that has an exhaust manifold 14 and an intake manifold 16. Further, the HEV 10 includes an electric motor 18. The ICE 12 and the motor 18 are mechanically coupled to a transmission 20. Preferably, the ICE 12 and the motor 18 are coupled to the transmission 20 such that they are parallel to each other. The transmission 20 provides mechanical power from the ICE 12 and/or the motor 18 to one or more wheels 22.

FIG. 1 further shows a battery 24 that is electrically connected to the motor 18 via an electrical bus 26. The battery 24 provides electric power to the traction motor 18. It can be appreciated that the battery 24 can be charged by connecting it to an external battery charger (not shown) or, preferably, by an electric generator as will be described below.

As shown in FIG. 1, the HEV 12 includes a turbocharger 28 that is connected to the ICE 12. Specifically, a turbine portion 30 of the turbocharger 28 is in fluid communication with the exhaust manifold 14 of the ICE 12 and a compressor portion 32 of the turbocharger 22 is in fluid communication with the intake manifold 16 of the ICE 12. Additionally, an electric generator 34 is mechanically coupled to the turbine portion 30 of turbocharger 28, such as by a drive shaft 36 extending from within the turbocharger 28. Because the turbine portion 30 of turbocharger 28 is driven by exhaust gases from exhaust manifold 14, generator 34 comprises an "exhaust gas driven" generator (EGDG). The EGDG 34 is also electrically connected to the electrical bus 26 between the motor 18 and battery 24 via the connection 38. Accordingly, when the turbocharger shaft 36 rotates, the EGDG 34 may create electricity that can be used as auxiliary power for the motor 18. As shown, the EGDG 34 is also connected to the battery 24. As such, the EGDG 34 can also be used to charge the battery 24 and/or power electrical accessories during operation of the HEV 10 as regulated by a microprocessor described below.

FIG. 1 shows that the HEV 10 further includes a microprocessor 40 that is connected to the ICE 12 via line 42. Further, the microprocessor 40 is connected to the motor 18 via line 44. The microprocessor 40 is also connected to the battery 24 via line 46 and to the EGDG 34 via line 48. As shown, the microprocessor is also connected to the turbocharger via line 50. Lastly, microprocessor 40 is connected to a pressure sensor 52 via line 54. In this way, microprocessor 40 can monitor and regulate operation of these components in the vehicle.

It can be appreciated that the microprocessor 40 can be used to monitor and control the flow of power from the EGDG 34 to the motor 18 and the battery 24 based on the operation of the ICE 12 and the power consumption of the motor 18. Moreover, the microprocessor 40 can be used to control the transfer of power from the motor 18 to the transmission 20 based on the demands of the HEV 10 during operation. Finally, the microprocessor 40 can control the turbocharger 28, such as when a boost is required by the ICE 12 from the turbocharger 28. The pressure sensor 52 is provided to monitor the pressure output of the compressor section 32 of turbocharger 28 for pressure control. It will be appreciated that a waste gate or variable vane turbine (not shown) could be used to control pressure under microprocessor control.

Figure 2:
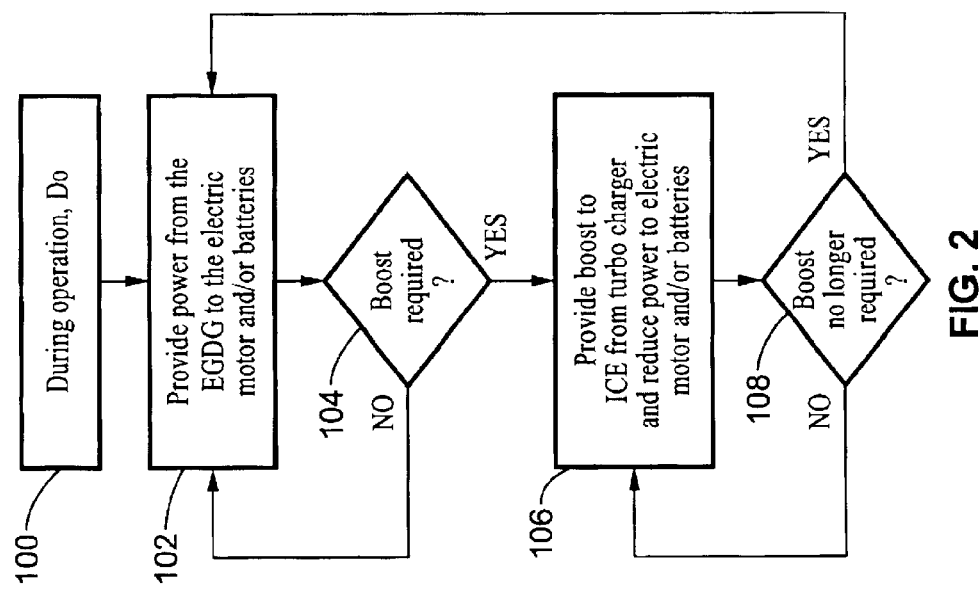
FIG. 2 is a flow chart of the overall operating logic according to the present invention.

Referring now to FIG. 2, an embodiment of the overall operating logic according to the present invention is shown and commences at block 100 with a do loop, wherein during operation, the following steps are performed. At block 102 power is provided from the EGDG 34 to the traction motor 18. In lieu of providing power to the traction motor 18, the electricity generated by the EGDG 34 can be used to charge the traction battery 24. It can be appreciated that the EGDG 34 can be used to power the traction motor 18 and charge the traction battery 24. Moving to decision diamond 104, it is determined whether a boost from the turbocharger 28 is required, such as due to a change in elevation in which the HEV 10 is operating. If a boost is not required, the logic returns to block 102 and power from the EGDG 34 continues to be provided to the traction motor 18.

On the other hand, if a boost is required, at decision diamond 104 the logic moves to block 106 and a boost is provided to the ICE 12 from the turbocharger 28. Thereafter, proceeding to decision diamond 108, it is determined whether a boost is no longer required. If not, the logic returns to block 102 and power continues to be provided to the traction motor 18 from the EGDG 34. Conversely, if a boost continues to be required, the logic returns to block 106 where the boost is provided to the ICE 12 from the turbocharger 28. It can be appreciated that the microprocessor 42 can be used to determine when a boost from the turbocharger 28 is required based on the operation of the ICE 12 and the absolute pressure in the intake manifold 16 via pressure sensor 52.

EXAMPLE

In a non-limiting, exemplary embodiment, used during experimentation, the HEV 10 is a Ford Explorer with a parallel-drive electric motor and battery, dominant HEV powertrain, having an ICE and a traction motor. The parallel-drive powertrain allows for the use of the primary and secondary power supplies, such as the ICE and the traction motor, to be used independently or in unison. Preferably, the traction motor and the traction battery are used as a primary power supply. This enables the ICE, such as a Saturn 1.9 L Si engine burning E85 fuel, to operate at engine speeds corresponding to higher efficiencies and lower emissions. These preferred engine speeds are typically in the range of approximately one thousand five hundred rpm to approximately four thousand five hundred rpm because the electric motor provides the torque for the initial acceleration of the vehicle.

In addition to generating power, the EGDG can be used to control the amount of boost to the intake manifold in a manner that does not "waste" the energy being produced by the turbine, similar to the manner in which a waste gate or variable turbine geometry does so in a standard turbocharger presently available. The waste gate allows exhaust gases to bypass the turbine in order to maintain the operating pressures of the compressor below the surge limit, where vibratory shock waves develop and damage the bearings of the assembly. The variable turbine geometry technology changes the trim of the turbine vanes, reducing the amount of energy the turbine produces to maintain the compressor pressures below the surge limit. The EGDG uses a standard waste gate for backup protection of the turbocharger if failure of the EGDG's electronic controller occurs. In the case of control failure, the EGDG can operate like a conventional turbocharger and, accordingly, will not have a catastrophic effect on the vehicle and vehicle operation can be continued until repairs are undertaken.

In a preferred, non-limiting embodiment, the turbocharger is capable of providing ample boost to maintain the intake manifold pressure at a set value at all altitudes up to 12,000-ft above sea level (corresponding to a pressure of 0.54 atm). Moreover, the pressure value for the intake manifold is established as one and one-tenths atmospheres (1.1 atm). The 1.1 atm pressure was chosen to give ample boost to increase the current ninety percent (90%) volumetric efficiency of the ICE to a value closer to one-hundred percent (100%). The 1.1 atm pressure will help compensate for the back pressure generated by the turbine. It can be appreciated that the value for the intake manifold pressure can be adjusted to maintain the 100% volumetric efficiency or controlled by the microprocessor to meet intended performance criteria for the vehicle application. It is to be understood that the elevation of 12,000-ft. was chosen because it corresponds to the highest interstate mountain pass in the United States, and is more than likely the highest elevation at which the HEV is to be operated.

It is further to be understood that for the best performance possible from the turbocharger, the compressor efficiency should be highest at the pressure ratio across the compressor, or boost, corresponding to the maximum altitude. This is due to the intention of the present invention to use the EGDG to produce boost at high altitude and generate electricity at low altitude. It is to be understood that the thermodynamic efficiency of a typical turbocharger compressor does not vary substantially as a function of boost for a given shaft speed; namely, only about ten percent to fifteen percent.

As can be seen, therefore, the turbocharger has a controlled constant or variable outlet pressure for altitude compensation, for controlling power output, or for both altitude compensation and controlling power output.

Figure 3:
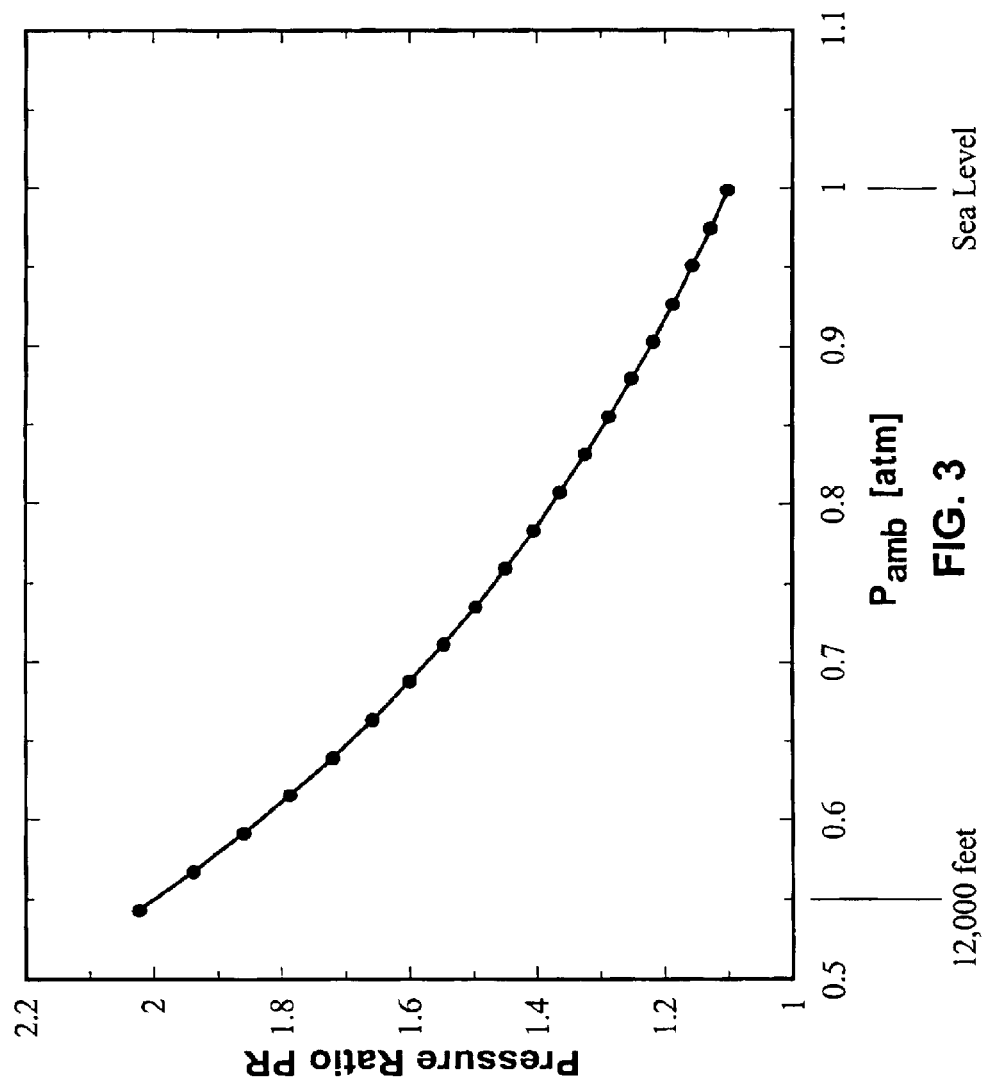
FIG. 3 is a graph showing the pressure ratio of a compressor (PR) versus the ambient air pressure (atm) for pressure output of 1.1 atm.

FIG. 3 shows the pressure ratio across the compressor, or boost, required to maintain the intake manifold pressure at 1.1 atm as a function of the ambient air pressure. As shown, the maximum pressure ratio across the compressor is approximately 2:1. This maximum pressure ratio across the compressor corresponds to an elevation of 12,000-ft above sea level. For a pressure ratio of 2:1 across the compressor, and the air flow requirements of the 1.9 L Saturn engine, a Garrett® GT12 turbocharger is used as a representative example of readily available turbochargers, although any properly sized turbocharger can be used.

Figure 4:
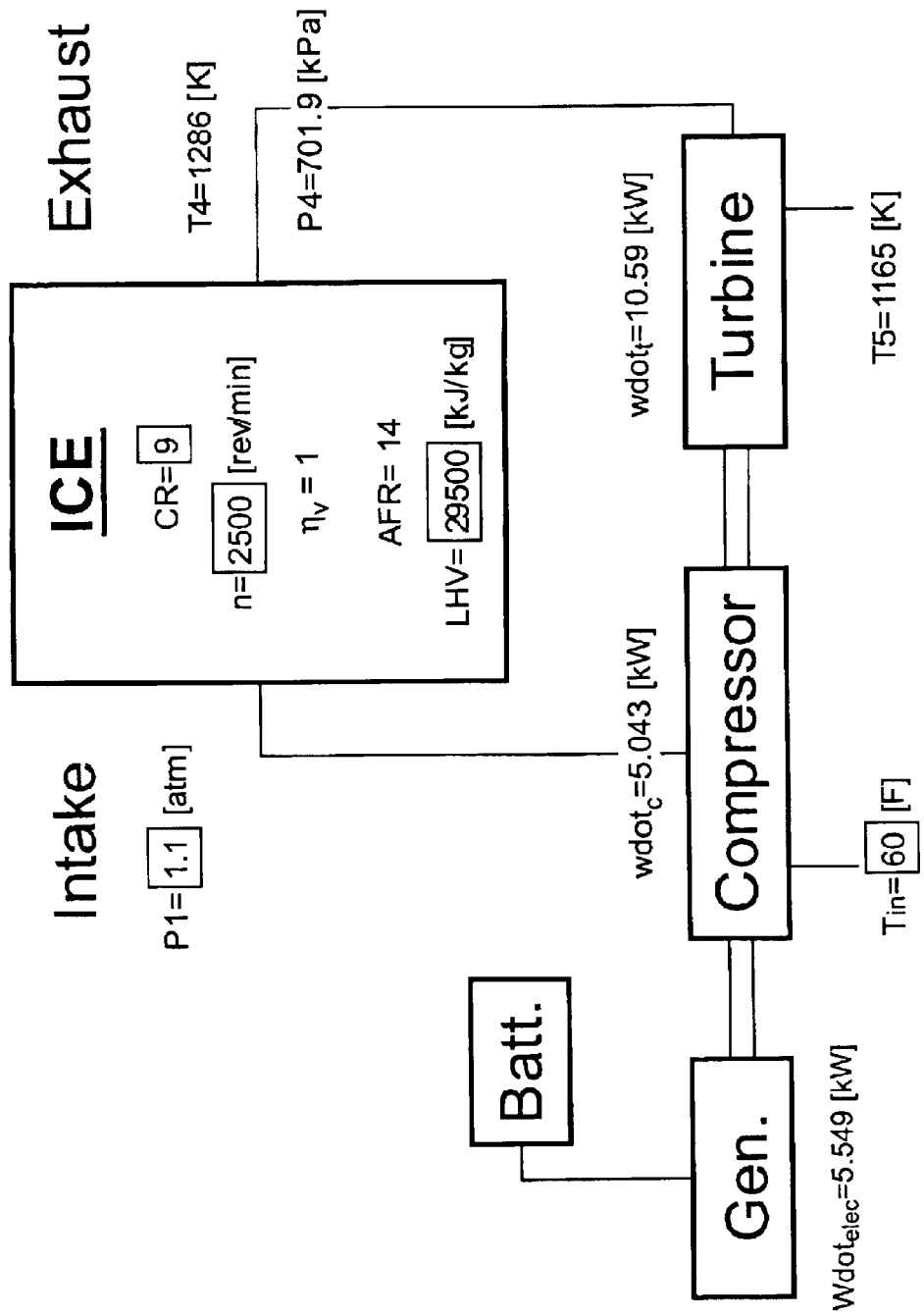
FIG. 4 is a block diagram showing a model for an internal combustion engine with the exhaust gas driven generator system of the present invention in place, wherein values for the output variables are shown for operation at 12,000 feet above sea level.

In order to predict the power produced in the turbine of the turbocharger, the power used by the compressor of the turbocharger, and the power available to drive the generator, it was necessary to develop a mathematical model of the ICE and turbocharger system, shown in FIG. 4. It was then necessary to compare the model with the EGDG system to a baseline model, consisting of the ICE only, in order to determine the improvement achieved with the EGDG.

Figure 5:
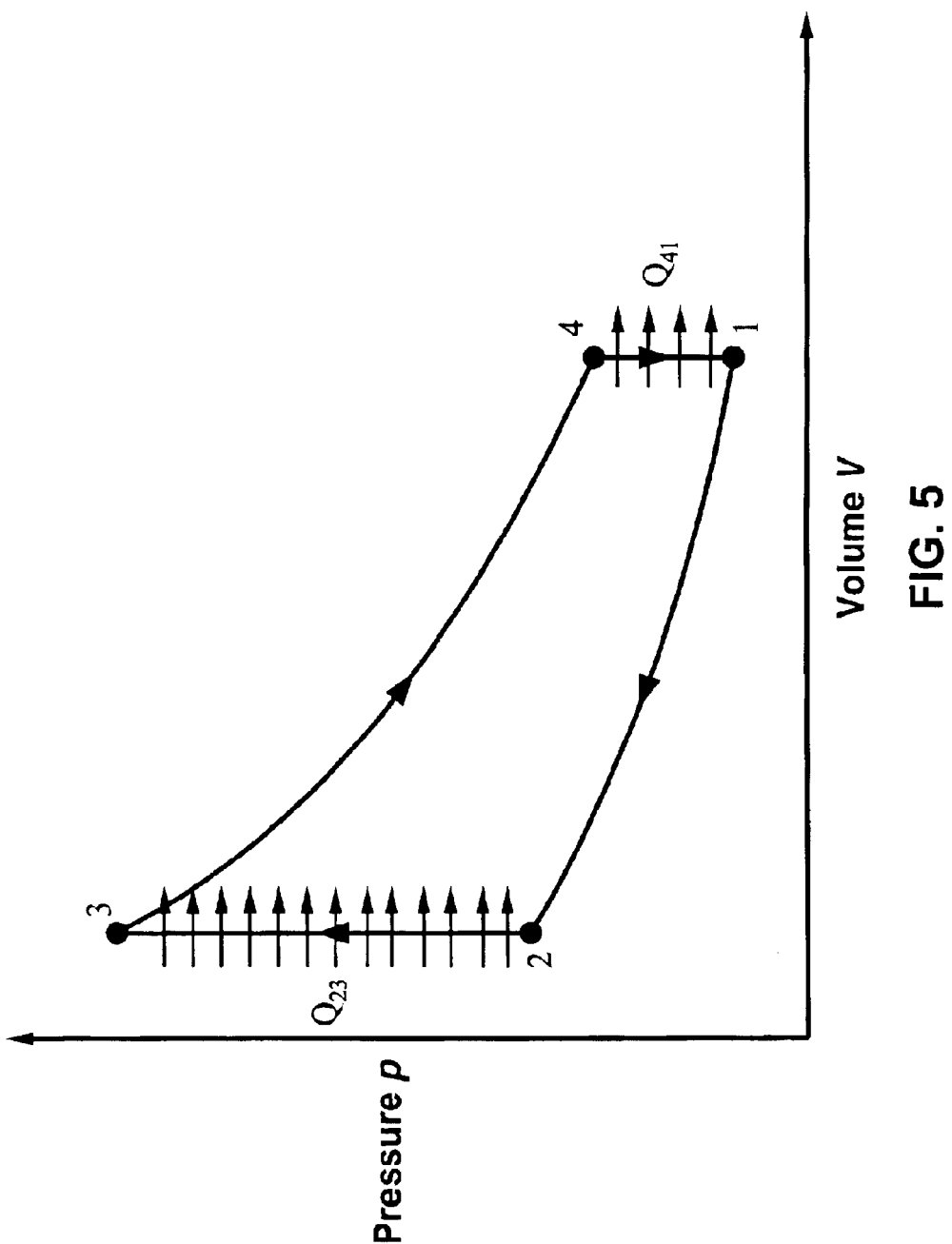
FIG. 5 is a P-v diagram for the Idealized Otto Cycle.

The model for the Saturn 1.9 L ICE is based on the idealized Otto engine model using ethanol E85 as a fuel. The calculations would be similar for any fuel in a spark ignition internal combustion engine. FIG. 5 shows the P-v diagram for the Otto Cycle. It can be appreciated that this is an acceptable approximation for the proof of the present invention. The actual benefits of the EGDG system provided by the present invention can vary with the application and are modeled using correlations developed during in-vehicle testing.

Figure 6:
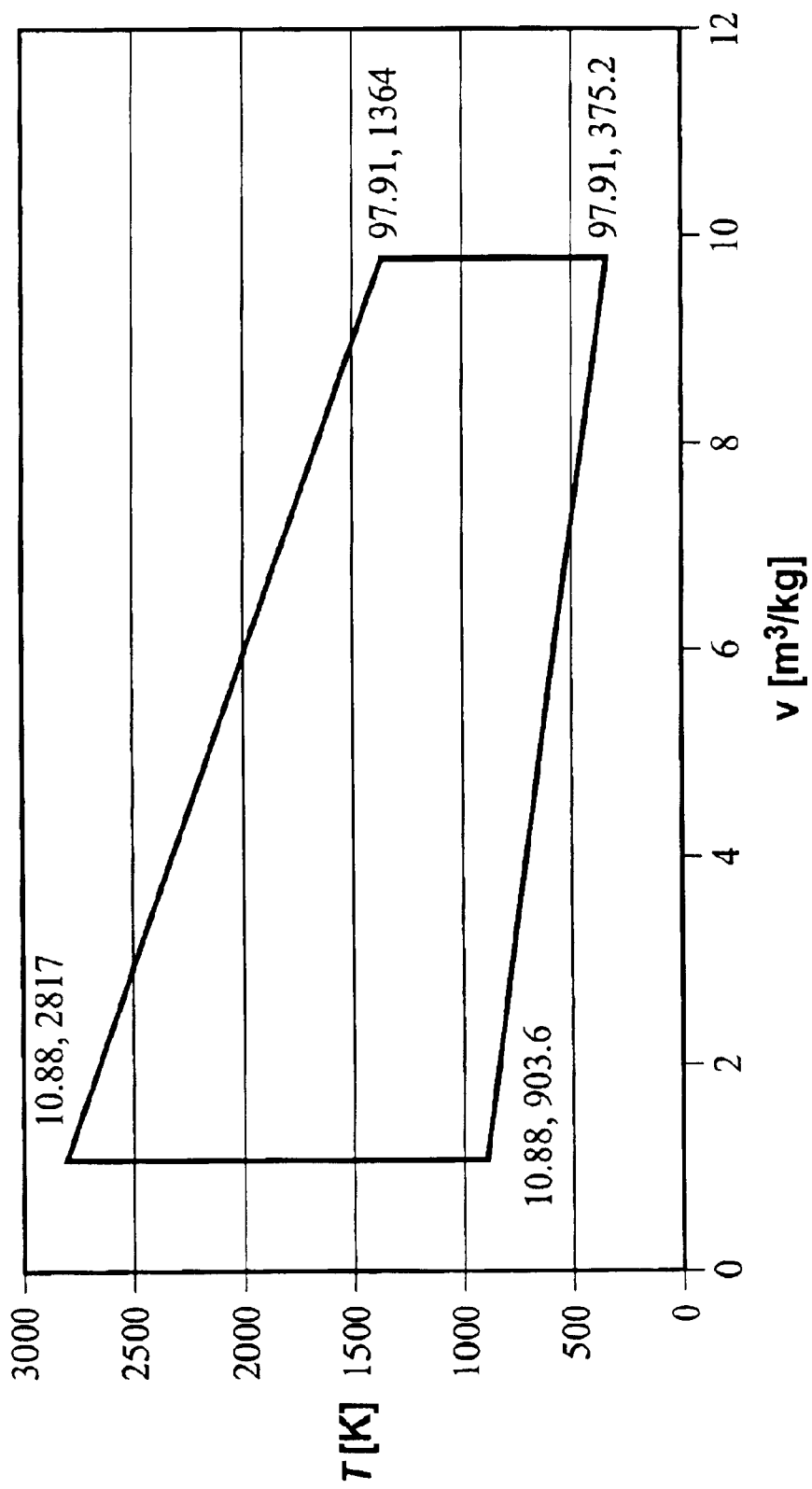
FIG. 6 is a T-v diagram for a 1.9 liter (L) Saturn engine assuming an idealized Otto cycle operating at 2500 revolutions per minute (rpm), volumetric efficiency of ninety percent (90%), a compression ratio of 9:1, and an air/fuel ratio of 15:1 at twelve thousand feet (12,000 ft.) above sea level and an ambient temperature of sixty degrees Fahrenheit (60° F.).

The temperature and specific volume data that is shown in FIG. 6 is generated based on the Otto Cycle model for the Saturn 1.9 L ICE, presented in FIG. 5. It is to be understood that certain assumptions were made during testing. For example, it was assumed that the working fluid was air with the specific heat and ratio of specific heats for air in the regions between points 1 and 2, and points 2 and 3, and the properties of the exhaust gas between points 3 and 4, shown in FIG. 5.

It is to be further understood that the pressure losses, due to cylinder valve flow restrictions and air plumbing for the turbocharger, were not considered because of the complexity that would be introduced to the mathematical model, which is unnecessary for a cursory investigation. The above assumption allows for the properties of the intake charge to be considered the same as those at the exit of the compressor section of the turbocharger, and the properties of the exhaust gases at the entrance to the turbine section of the turbocharger to be considered the same as at the exit of the ICE. In actual fact, a close coupled catalyst between the internal combustion engine and turbine may increase the inlet temperature to the turbine.

Corresponding to the Otto cycle, the heat is added and exhausted adiabatically at constant volume and the compression and expansion (power) processes are considered to be isentropic in nature. To determine the properties at point 2 in the cycle with point 1 as the engine intake conditions, the following equations are used:

$$v_2 = \frac{v_1}{CR}$$

where $v_1$ and $T_1$ correspond to the specific volume and temperature, respectively, of the intake air charge after the compressor of the turbocharger, $\gamma$ is the ratio of specific heats of air (1.4), and CR is the compression ratio of the ICE (9:1).

The temperature, $T_2$, and specific volume, $v_2$, from the above equations are used to determine the specific internal energy, $u_2$, and the pressure, $P_2$, from standard thermodynamic property tables for air well known in the art. Then, $u_2$ is used in the following equation to determine $u_3$, which corresponds to $T_3$ from the air tables.

$$u_3 = \frac{LHV \cdot m_{dotfuel} + u_2 \cdot m_{dotair}}{m_{dotex}}$$

where LHV is the lower heating value of the E85 or combustion fuel, $m_{dotfuel}$ is the mass flow rate of the fuel, $m_{dotair}$ is the mass flow rate of air, and $m_{dotex}$ is the mass flow rate of the exhaust gases, which is the sum of $m_{dotair}$ and $m_{dotfuel}$ because of conservation of mass.

From the assumptions made about the engine cycle, $v_3=v_2$. Using the value determined for $T_3$ and the information that has been determined for the specific volume, in conjunction with the air tables, the pressure, $P_3$, and entropy $s_3$ can be determined.

To determine the properties at point 4 or the exhaust conditions, the following equations were used:

$$v_4 = v_3 \cdot CR$$

$$T_4 = T_3 \cdot \left(\frac{1}{CR}\right)^{\gamma-1}$$

$$s_4 = s_3$$

where $\gamma$ is the ratio of specific heats for the exhaust gases (1.33). Using the parameters calculated in the previous equations and the assumption for entropy with the air tables gives the exhaust pressure, $P_4$, which is used to calculate the power generated across the turbine section of the turbocharger.

In order to maintain the simplicity of the model to convey the proof of concept, the following assumptions were made about the operation of the turbine: (1) the turbine operates at a constant speed of 192665 RPM, (2) the expansion ratio of the exhaust gasses across the turbine section of the turbocharger remains constant at 2:1, and (3) the thermodynamic efficiency of the turbine remains constant at approximately sixty percent (60%).

Figure 7:
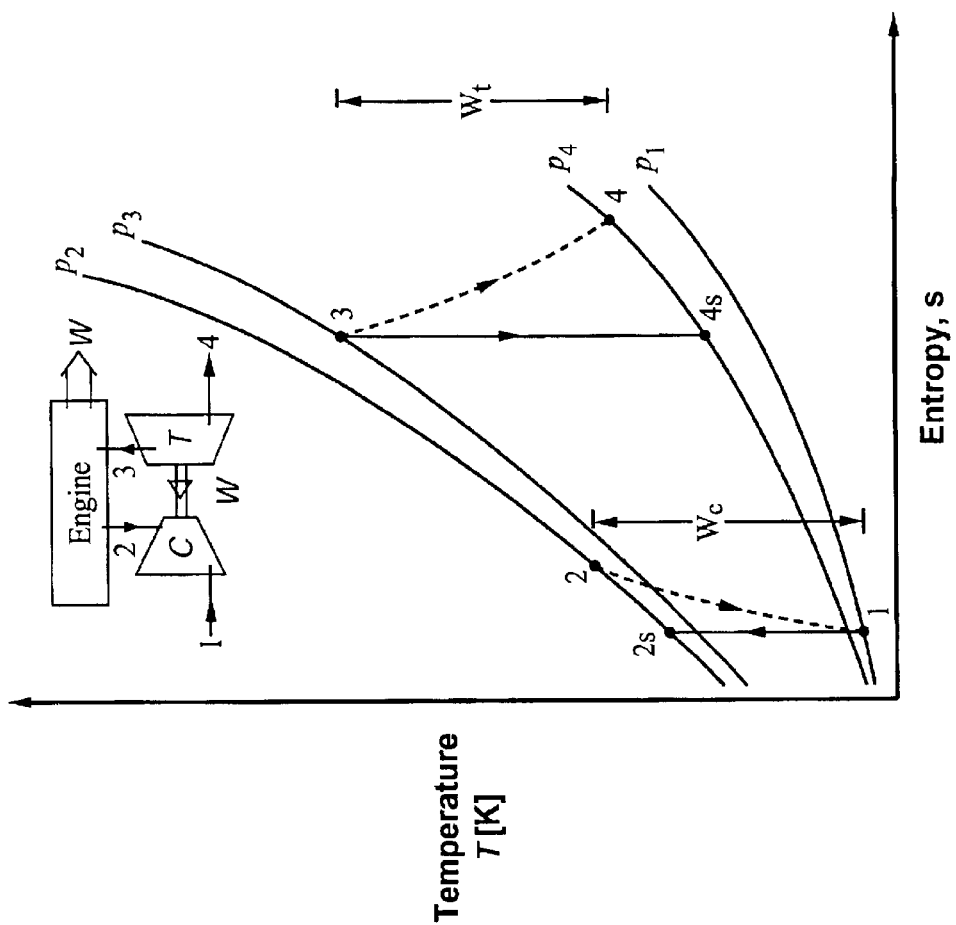
FIG. 7 is a T-s diagram for a typical turbocharger.

Referring now to FIG. 7, a pictorial representation of the thermodynamics that govern the performance of a typical turbocharger is shown. The points in FIG. 6 correspond to the subscripts in the following equations:

$$T_{2s} = T_1 \cdot \left(\frac{p_2}{p_1}\right)^{\frac{(\gamma-1)}{\gamma}}$$

$$T_2 = \frac{T_{2s} - T_1}{\eta_c} + T_1$$

where $T_x$ is the temperature at point x, $T_{xs}$ is the isentropic temperature at point x, $p_x$ is the pressure at point x, $\eta_c$ is the isentropic efficiency of the compressor, and $\gamma$ is the ratio of specific heats of air ($\gamma=1.4$). To determine $\eta_c$ as a function of pressure ratio (PR), points from the compressor map for the Garrett® GT12 turbocharger are plotted and a second order polynomial fit can be applied to the data. This degree of polynomial fit results in the best fit for the data. However, the $R^2$ correlation factor is still only 0.65, which is not a very close correlation. It can be appreciated that the quality of the fit for this particular data is not overly important because of the variation in compressor characteristics between turbocharger manufacturers. However, it can be appreciated that it is important to have a representative equation to relate the pressure ratio to the efficiency in order to add capability to the model for purposes of parametric studies.

Figure 8:
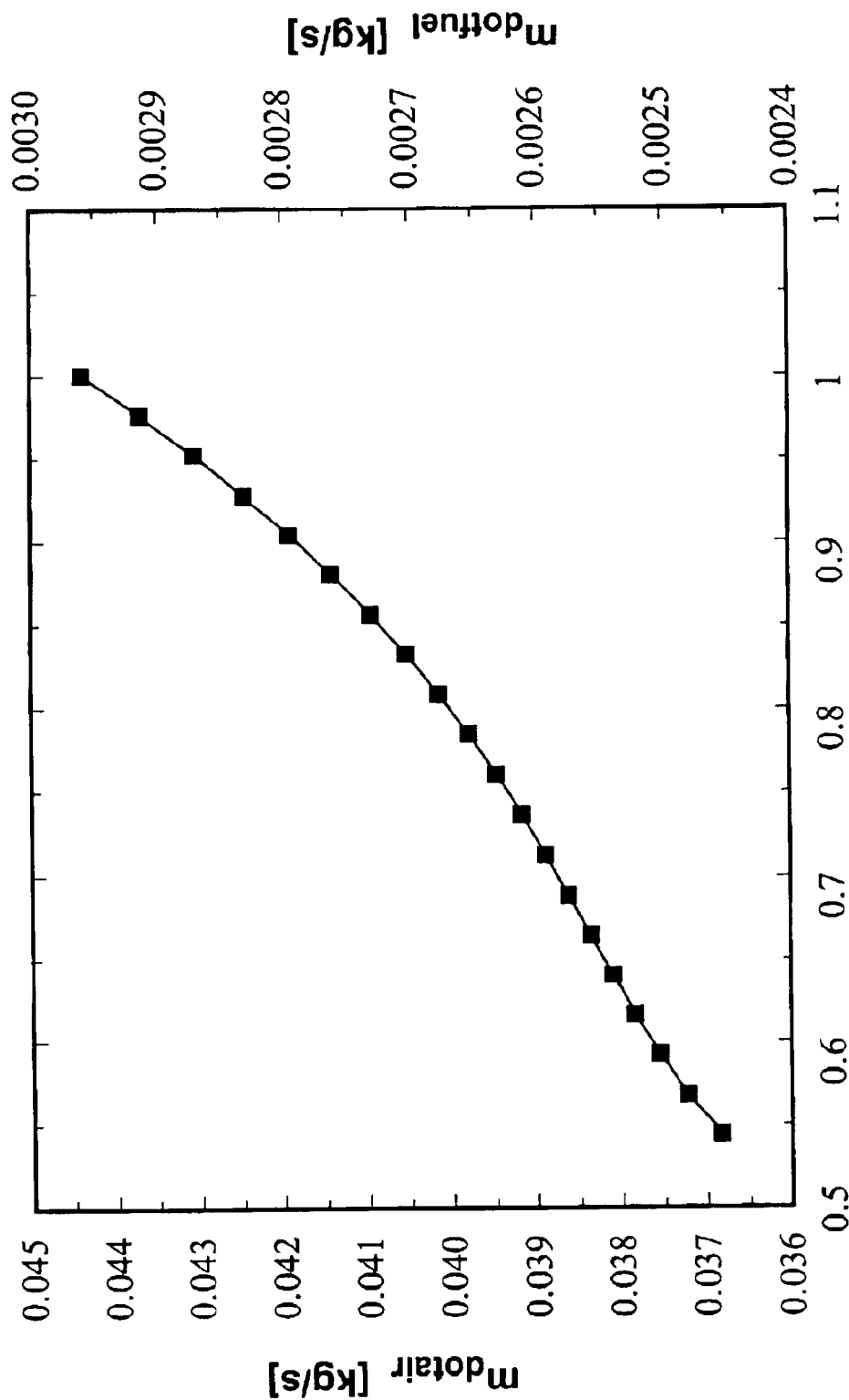
FIG. 8 is graph showing the mass-flow rate of air and fuel (kg/s) versus ambient air pressure (atm) for a conventional internal combustion engine operating according to the assumptions in FIG. 6.

FIG. 8 shows the mass flow rates of both the air and the E85 fuel as a function of the ambient air pressure, $P_{amb}$ (atm). The mass air flow (kg/s) corresponds to the left vertical axis, and the mass fuel flow (kg/s) corresponds to the right vertical axis. The line fit has the highest deviation from the data in the low PR range, which suggests that the mass flow rate of the air, and coincidentally the fuel, would be higher at operating conditions closer to sea level. An increased mass flow can occur due to the higher efficiency of the actual data, as compared with the line fit equation. The temperature increase across the compressor is typically less and conversely, the air density is higher at the intake, requiring more fuel be added to maintain a stoichiometric air/fuel ratio.

For the turbine side of the turbocharger the following equations were used to determine the exhaust temperatures:

$$T_{4s} = T_3 \cdot \left(\frac{p_4}{p_3}\right)^{\frac{(\gamma-1)}{\gamma}}$$

$$T_4 = T_3 - \eta_t \cdot (T_3 - T_{4s})$$

where $\eta_t$ is the isentropic efficiency of the turbine, and $\gamma$ is the ratio of specific heats of the exhaust ($\gamma=1.33$). It is to be understood that the problem presented for determining $\eta_c$ does not exist for $\eta_t$. This is because the efficiency of the turbine remains constant at approximately sixty percent (60%) for the assumed shaft rotation speed.

Figure 9:
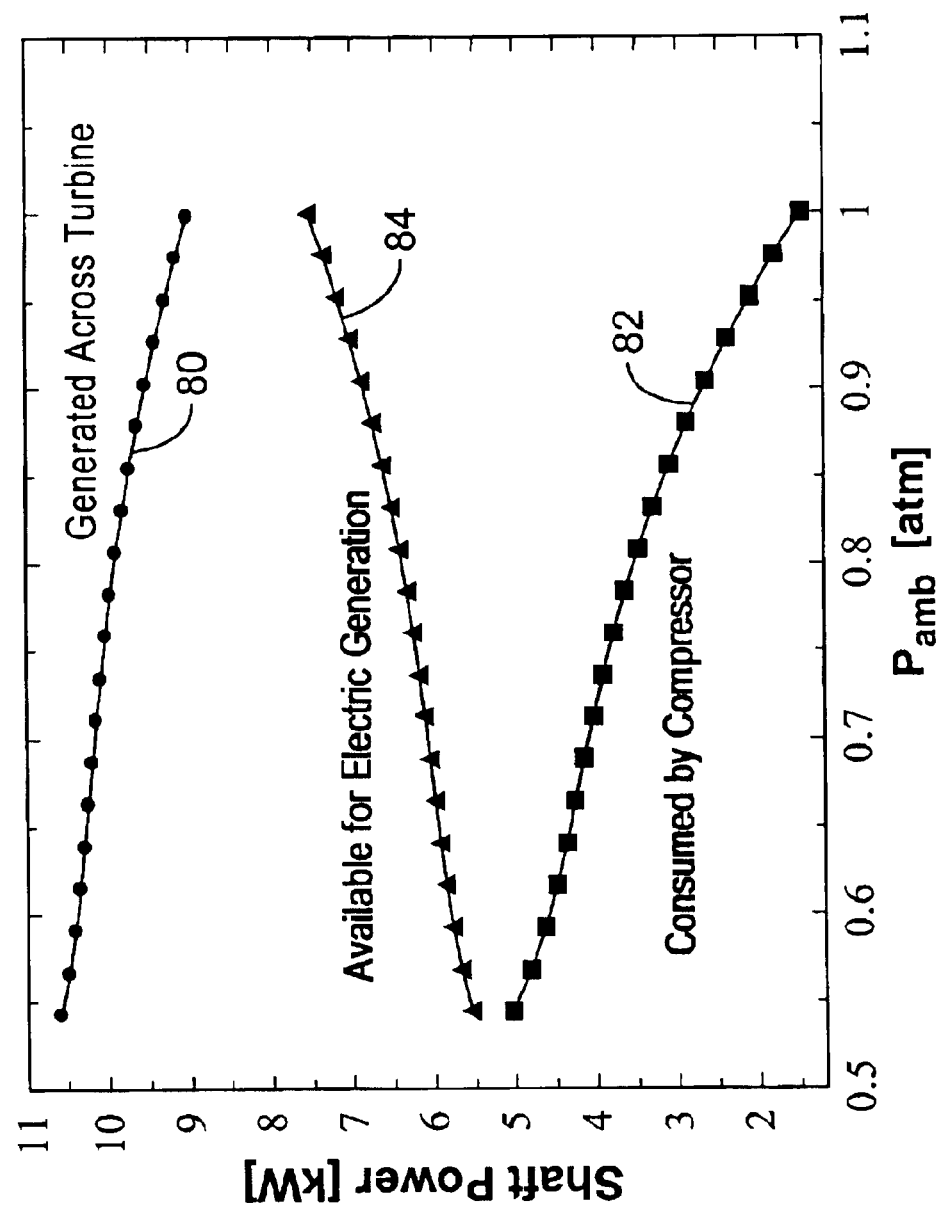
FIG. 9 is a graph showing shaft power (kW) of a turbocharger versus ambient air pressure (atm).
Figure 10:
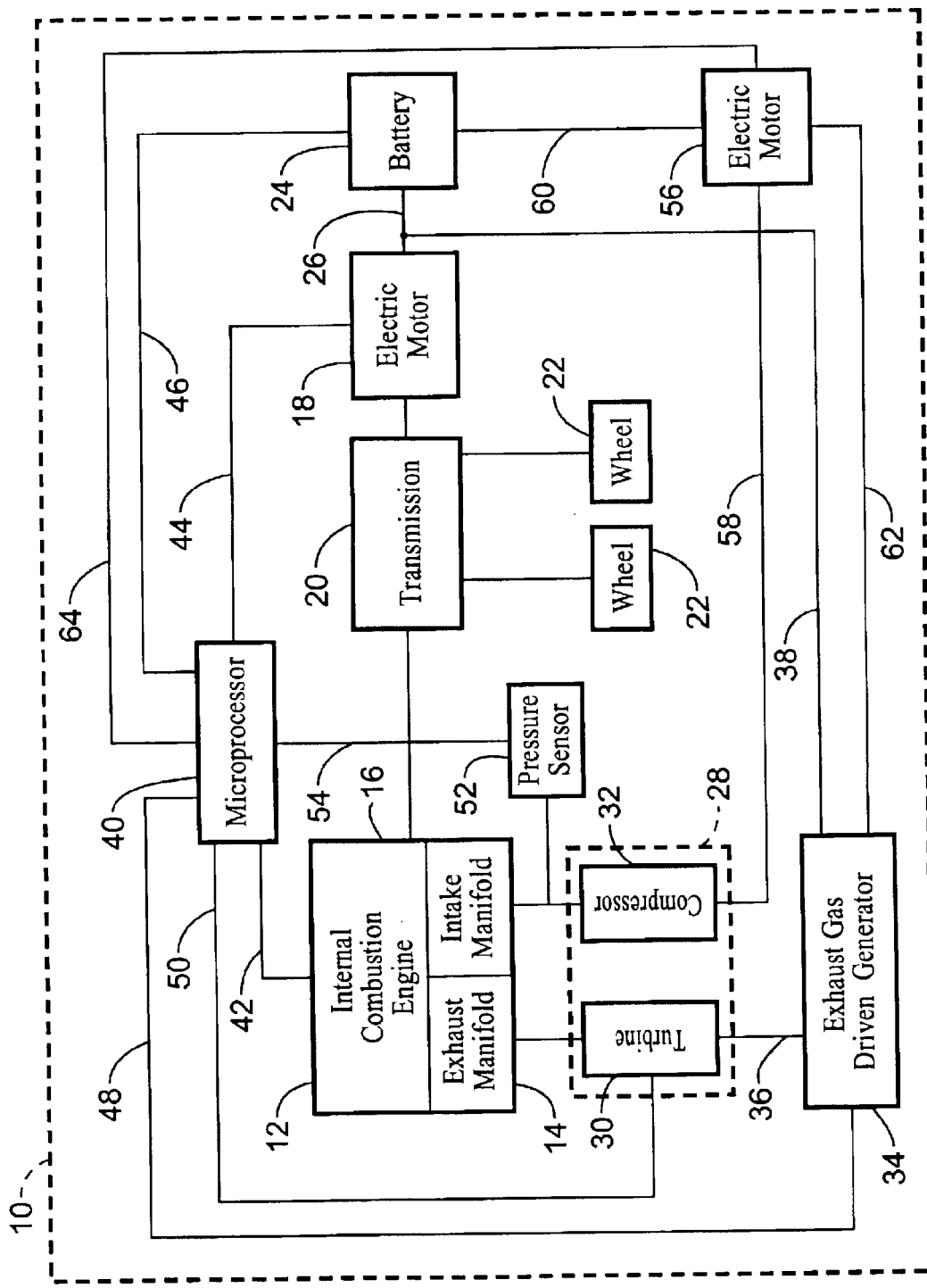
FIG. 10 is a block diagram of an alternative embodiment of the hybrid electric vehicle shown in FIG. 1 wherein the turbocharger employs a separate turbine and compressor, and the compressor is powered by an electric motor.

Work done by the compressor, $W_c$, and the turbine, $W_t$, are:

$$W_c = C_{p,air}(T_2 - T_1) \text{ [kJ/kg]}$$

$$W_t = C_{p,ex}(T_3 - T_4) \text{ [kJ/kg]}$$

where $C_{p,air}$ and $C_{p,ex}$ correspond to the constant pressure specific heat of air (1.01 kJ/(kg*K)) and exhaust (1.15 kJ/(kg*K)), respectively. It is to be understood that to obtain the power produced by the turbine and that consumed by the compressor, the mass flow rate, in kg/s, of the appropriate working fluid is multiplied to the work terms. This operation results in the power, in kW, and is shown in FIG. 9 as a function of the ambient air pressure. The top line 80 is the power generated by the turbine, the bottom line 82 is the power consumed by the compressor, and the center line 84 is the amount of power available to drive the generator and is the difference between the top and bottom.

It is to be understood that the selection of a ten kilowatt (10 kW) generator, i.e., the EGDG, capable of operating at speeds up to 200,000 rpm was based on many factors. The options that were considered include the following: (1) permanent magnet, brushless DC (PM) motor/generators, (2) switch-reluctance motor/generators (SRMs), and (3) high-speed AC motor/generators.

It is to be understood that the motor/generator must be capable of not only operating at the desired speed, but must also be able to withstand the high temperature environment of the engine exhaust manifold region of the ICE. The high temperature environment of the ICE enclosure poses further difficulties for the electric power generation because of the tendency of electric motor/generators to lose efficiency as the operational temperature increases. To mediate the effects of the high temperature, motor/generators with the option of being liquid cooled are more attractive. Liquid-to-air cooling is more feasible than air-to-air cooling due to the reduced amount of space required for the heat exchanger of a liquid-to-air system. The liquid cooling system also has a higher heat capacity than does an air cooling system.

The present invention recognizes that PM motor/generators typically have a maximum speed of forty thousand rpm to sixty thousand rpm, which is well below the speed that is necessary to obtain the generation characteristics that are desired. Moreover, these PM motor/generators also have relatively low efficiencies, which reduce even farther when operated as a generator. This low efficiency can result in an elevation in operational temperatures that can result in a higher heat load for the cooling system to mediate this effect. However, the PM motors have the distinct advantages of lower cost, high application adaptability because of the relative ease of motor control, and the option of liquid cooling.

Further, the present invention recognizes that SRMs have the advantages of being able to handle higher temperature environments with the option of liquid cooling, are capable of high-speed operation in the range of one hundred and fifty thousand rpm to two hundred thousand rpm, and have relatively high motoring and generating efficiencies. However, the SRMs are relatively expensive, tend to be relatively large, making them restricted in application, and have a more difficult motor control scheme to operate.

The present invention also recognizes that AC motor/generators are easy to control, experience the smallest drop in efficiency between motoring and generating, have the longest development history of the motor technologies (so they are low cost), and are capable of being liquid cooled. However, the AC motors tend to be relatively heavy because of the amount of copper windings necessary to handle the high-speed operation.

The Ford Explorer platform developed for testing of the EGDG system of the present invention makes use of a NiMH traction battery with a capacity of eighteen kilowatt hours (18 kWh) and an operating voltage potential between three hundred volts (300V) and four hundred volts (400V).

It can be appreciated that for a conservative value for total generator efficiency (including generation, rectification, transformer, and battery charging efficiencies) of fifty percent (50%), the power made available to the traction battery varies between 2.275 kW and 3.767 kW. At the constant voltage of four hundred volts (400 V), in order to maintain a charging potential for varying battery states of charge (SOCs), a variation in current from 6.938 A to 9.418 A is necessary. At these relatively low values for current, the charging efficiency of the traction battery is ninety-five percent (95%).

To determine the amount of energy the EGDG can provide to the traction battery, it was necessary to consider the operational data of the HEV in which the EGDG is installed. In other words, how long does the ICE run during normal operation. In the Ford Explorer platform described above, the ICE runs on average thirty (30) minutes per hour of operation of the HEV. As such, the EGDG can provide between 1.387 kWh and 1.884 kWh of energy to the traction battery. Stated differently, the EGDG can supply the large traction battery of the Ford Explorer HEV with the energy needed to completely charge the battery in approximately nine and one-half hours of operation of the HEV at sea level and thirteen hours of operation at an elevation of 12,000 ft. above sea level. However, with the preferred control scheme described above in conjunction with FIG. 2 and utilized in the Ford Explorer HEV, the energy that the EGDG supplies to the traction battery does not charge the battery, but instead can be used immediately to drive the traction motor. Accordingly, the fuel mileage of the HEV can be increased by making use of the otherwise wasted exhaust heat. The present control scheme tries to maintain the SOC of the traction battery at twenty percent, meaning that a complete charging of the traction battery is not achieved during the operation of the vehicle, but rather only when the vehicle is in a plugged-in charging cycle connected to the electric grid.

In a conventional vehicle the objective would be to use the EGDG to replace an alternator. Then to regulate the turbine speed, a waste gate or variable van turbine can be controlled by the microprocessor a microprocessor controlled waste gate or variable turbine may be used.

It is to be understood that the present invention utilizing an EGDG is a viable option for both compensation of performance deterioration of an HEV at elevations higher than sea level and charging of the traction battery. The present invention does this effectively with little modification to the existing powertrain of a typical HEV. The EGDG also can improve the overall thermal efficiency of the HEV to approximately forty percent by making use of the otherwise wasted energy in the exhaust of the ICE to increase the volumetric efficiency and overcome pressure losses in the intake of the ICE.

In addition to increasing the power output from the ICE, the EGDG can also improve the specific fuel consumption of the ICE because of the increase in volumetric efficiency as a result of the pressurized intake charge.

It will be appreciated that the present invention can be embodied in other ways as well. For example, referring to FIG. 10, the turbine 30 and compressor 32 in the turbocharger 28 are not on a common shaft. Therefore, the turbine does not drive the compressor. In this embodiment, the compressor is coupled to an electric motor 56 by a shaft 58 and electric motor is in turn powered by the battery 24 through connection 60 and/or the exhaust gas driven generator 34 through connection 62. Electric motor 56 would also be connected to microprocessor 40 through connection 64. Accordingly, the entire system would be monitored and controlled by microprocessor 40.

Figure 11:
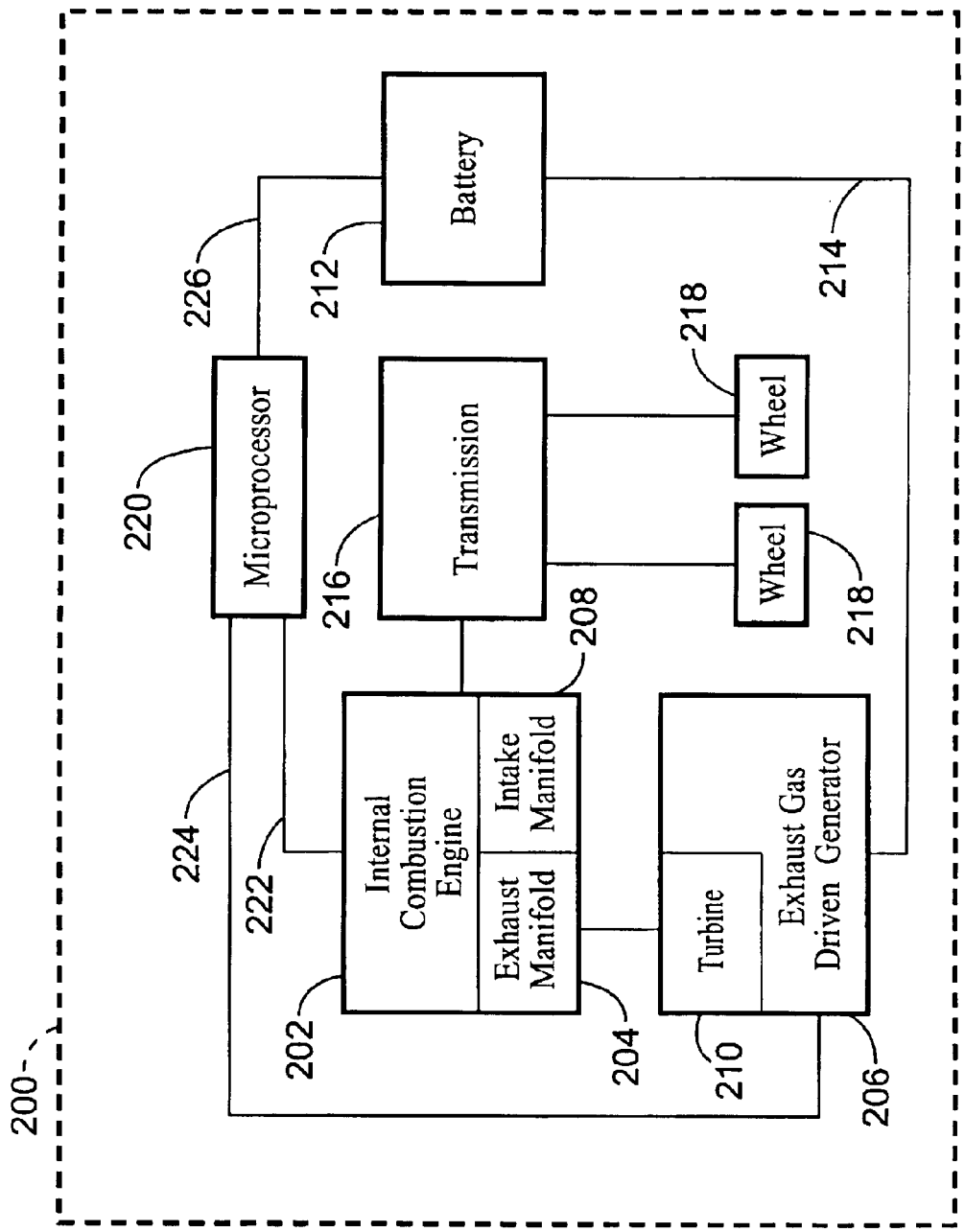
FIG. 11 is a block diagram of a conventional internal combustion engine driven vehicle with an exhaust gas driven generator system according to the present invention.

The invention can also be employed in conventional vehicles as well. Referring to FIG. 11, a vehicle 200 is shown with an exhaust gas driven generator system according to the present invention. In this embodiment, the exhaust manifold 204 of an internal combustion engine 202 is connected to an exhaust gas driven generator 206. Since there is no turbocharger in this embodiment, no connection need by made to intake manifold 208. Furthermore, since this embodiment does not include a turbocharger, exhaust gas driven generator 206 is shown as having an integral turbine 210 that is in fluid communication with exhaust manifold 204. Alternatively, a separate turbine could be disposed between exhaust gas manifold 204 and a conventional electric generator. Exhaust gas driven generator 206 is in turn connected to the vehicle battery 212 through a connection 214. Internal combustion engine 202 is connected to transmission 216 which is in turn connected to wheels 216. A microprocessor 220 is shown connected to internal combustion engine 202 via line 222, to exhaust gas driven generator 206 via line 224, and to battery 212 via line 226 for monitoring and control of the system in a manner similar to that described above with regard to the HEV implementation.

The invention can also be employed in conventional turbocharged internal combustion engine driven vehicles. The configuration would be the same as shown in FIG. 1 except that electric motor 18 shown in FIG. 1 would be eliminated.

Note that when the exhaust gas generator system of the present invention is employed in a conventional turbocharged or non-turbocharged internal combustion drive vehicle as described above, the system can be used to charge the battery and/or power the electrical accessories in the vehicle and, therefore, can serve as a replacement for the vehicle's alternator.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A power control method for a hybrid electric vehicle having an internal combustion engine, an electric motor, and a battery power supply, comprising:
   using a turbocharger to compensate for power loss in said internal combustion engine; and
   using power from said turbocharger to drive an electric generator configured for charging said battery power supply;
   wherein said turbocharger has a controlled constant or variable outlet pressure by using said electric generator and said battery for altitude compensation or for controlling power output, or for both altitude compensation and controlling power output.

2. A method as recited in claim 1, further comprising powering said motor from said generator.

3. A method as recited in claim 1, wherein charging said battery power supply from power provided by said turbocharger improves volumetric efficiency and effective thermal efficiency of said internal combustion engine.

4. A power control method for a hybrid electric vehicle having an internal combustion engine, an electric motor, and a battery power supply, comprising:
   coupling a turbocharger to said internal combustion engine;
   coupling an electric generator to said turbocharger and to said battery power supply;
   using said turbocharger to compensate for power loss in said internal combustion engine; and
   charging said battery power supply from power provided by said turbocharger;
   wherein said turbocharger has a controlled constant or variable outlet pressure by using said electric generator and said battery for altitude compensation or for controlling power output, or for both altitude compensation and controlling power output.

5. A method as recited in claim 4, further comprising powering said motor from said electric generator.

6. A method as recited in claim 4, wherein using power from said turbocharger to drive a generator configured for charging said battery power supply improves volumetric efficiency and effective thermal efficiency of said internal combustion engine.

7. In a hybrid electric vehicle comprising an internal combustion engine, an electric motor and a battery power supply, the improvement comprising:
   a turbocharger coupled to said internal combustion engine; and
   means for charging said battery power supply from power provided by said turbocharger;
   wherein said turbocharger has a controlled constant or variable outlet pressure for altitude compensation, for controlling power output, or for both altitude compensation and controlling power output.

8. An improvement as recited in claim 7, wherein said means comprises an electric generator mechanically coupled to said turbocharger and electrically connected to said battery power supply.

9. An improvement as recited in claim 8, further comprising means for controlling power output of said electric generator for charging said battery power supply while said engine is operational.

10. An improvement as recited in claim 7, wherein said electric generator is electrically connected to said motor and configured to supply at least partial power to said motor from power provided by said turbocharger.

11. An improvement as recited in claim 7, wherein charging said battery power supply from power provided by said turbocharger can improves volumetric efficiency and effective thermal efficiency of said internal combustion engine.

12. A hybrid electric vehicle, comprising:
   an internal combustion engine;
   an electric motor;
   a battery power supply coupled to said electric motor;
   a drivetrain configured to be coupled to said engine and said motor;
   a turbocharger coupled to said internal combustion engine; and
   means for charging said battery power supply from power provided by said turbocharger;
   wherein said turbocharger has a controlled constant or variable outlet pressure for altitude compensation or for controlling power output, or for both altitude compensation and controlling power output.

13. A hybrid electric vehicle as recited in claim 12, wherein said means comprises an electric generator mechanically coupled to said turbocharger and to said battery power supply.

14. A hybrid electric vehicle as recited in claim 12, wherein said electric generator is electrically connected to said motor and configured to supply at least partial power to said motor from power provided by said turbocharger.

15. A hybrid electric vehicle as recited in claim 12, further comprising means for controlling power output of said electric generator for charging said battery power supply while said engine is operational.

16. A hybrid electric vehicle as recited in claim 12, wherein charging said battery power supply from power provided by said turbocharger improves volumetric efficiency and effective thermal efficiency of said internal combustion engine.

17. A hybrid electric vehicle, comprising:
   an internal combustion engine;
   an electric motor;
   a battery power supply coupled to said electric motor;
   a drivetrain configured to be coupled to said engine and said motor;
   a turbocharger coupled to said internal combustion engine; and
   an electric generator mechanically coupled to said turbocharger and electrically connected to said battery power supply;
   wherein said electric generator is configured to charge said battery power supply from power provided by said turbocharger;
   wherein said turbocharger has a controlled constant or variable outlet pressure for altitude compensation, for controlling power output, or for both altitude compensation and controlling power output.

18. A hybrid electric vehicle as recited in claim 17, further comprising means for controlling power output of said electric generator for charging said battery power supply while said engine is operational.

19. A hybrid electric vehicle as recited in claim 17, wherein said electric generator is electrically connected to said motor and configured to supply at least partial power to said motor from power provided by said turbocharger.

20. A hybrid electric vehicle as recited in claim 17, wherein charging said battery power supply from power provided by said turbocharger improves volumetric efficiency and effective thermal efficiency of said internal combustion engine.

21. In a hybrid electric vehicle having an internal combustion engine, an electric motor and a battery power supply, the improvement comprising:
   a turbocharger coupled to said internal combustion engine; and
   an electric generator mechanically coupled to said turbocharger and electrically connected to said battery power supply;
   wherein said electric generator is configured to charge said battery power supply from power provided by said turbocharger; and
   wherein said turbocharger has a controlled constant or variable outlet pressure for altitude compensation or for controlling power output, or for both altitude compensation and controlling power output.

22. An improvement as recited in claim 21, wherein said electric generator is electrically connected to said motor and configured to supply at least partial power to said motor from power provided by the said turbocharger.

23. An improvement as recited in claim 21, further comprising means for controlling power output of said electric generator for charging said battery power supply while said engine is operational.

24. An improvement as recited in claim 21, wherein charging said battery power supply from power provided by said turbocharger improves volumetric efficiency and effective thermal efficiency of said internal combustion engine.

25. An energy control apparatus for a hybrid electric vehicle having an internal combustion engine, an electric motor, and a battery power supply, comprising:
   a turbocharger adapted to be coupled to said internal combustion engine; and
   an electric generator adapted to be mechanically coupled to said turbocharger and electrically connected to said battery power supply;
   wherein said electric generator is configured to charge said battery power supply from power provided by said turbocharger; and
   wherein said turbocharger has a controlled constant or variable outlet pressure for altitude compensation or for controlling power output, or for both altitude compensation and controlling power output.

26. An energy control apparatus as recited in claim 25, further comprising means for controlling power output of said electric generator for charging said battery power supply while said engine is operational.

27. An energy control apparatus as recited in claim 25, wherein said electric generator is adapted to be electrically connected to said motor and configured to supply at least partial power to said motor from power provided by said turbocharger.

28. An energy control apparatus as recited in claim 25, wherein said electric generator is adapted to be electrically connected to said motor and configured to supply at least partial power to said motor from power provided by said turbocharger.

29. An apparatus as recited in claim 25, wherein charging said battery power supply from power provided by said turbocharger improves volumetric efficiency and effective thermal efficiency of said internal combustion engine.

30. An energy control apparatus for a hybrid electric vehicle having an internal combustion engine, an electric motor, and a battery power supply, comprising:
- a turbocharger adapted to be coupled to said internal combustion engine; and
- an electric generator adapted to be mechanically coupled to said turbocharger and electrically connected to said battery power supply;
- wherein said electric generator is configured to charge said battery power supply from power provided by said turbocharger; and
- wherein said electric generator is configured to supply at least partial power to said motor from power provided by said turbocharger; and
- wherein said turbocharger has a controlled constant or variable outlet pressure for altitude compensation or for controlling power output, or for both altitude compensation and controlling power output.

31. An energy control apparatus as recited in claim 30, further comprising means for controlling power output of said electric generator for charging said battery power supply while said engine is operational.

32. An apparatus as recited in claim 30, wherein charging said battery power supply from power provided by said turbocharger improves volumetric efficiency and effective thermal efficiency of said internal combustion engine.

33. In a vehicle having an internal combustion engine and a battery, the improvement comprising:
- a turbocharger adapted to be coupled to said internal combustion engine;
- an electric generator adapted to be mechanically driven by said turbocharger;
- said electric generator adapted to be electrically connected to said battery; and
- means for controlling power output of said electric generator for charging said battery or supplying power to electrical load in said vehicle while said engine is operational.
- wherein said turbocharger has a controlled constant or variable outlet pressure by using said electric generator and battery for altitude compensation or for controlling power output, or for both altitude compensation and controlling power output.

34. An improvement as recited in claim 33, wherein driving said electric generator with said turbocharger and charging said battery with said electric generator improves volumetric efficiency and effective thermal efficiency of said internal combustion engine.

35. In a vehicle having an internal combustion engine and a battery, the improvement comprising:
- a turbocharger adapted to be coupled to said internal combustion engine;
- an electric generator adapted to be coupled to said turbocharger and driven by exhaust gas from said internal combustion engine;
- said electric generator adapted to be electrically connected to said battery; and
- means for controlling power output of said electric generator for charging said battery or supplying power to electrical load in said vehicle while said engine is operational.
- wherein said turbocharger has a controlled constant or variable outlet pressure by using said electric generator and battery for altitude compensation or for controlling power output, or for both altitude compensation and controlling power output.

36. An improvement as recited in claim 35, wherein driving said electric generator with said turbocharger and charging said battery with said electric generator improves volumetric efficiency and effective thermal efficiency of said internal combustion engine.

37. An energy control apparatus for a vehicle having an internal combustion engine and a battery, comprising:
- a turbocharger adapted to be coupled to said internal combustion engine;
- an electric generator adapted to be mechanically driven by said turbocharger;
- said electric generator adapted to be electrically connected to said battery; and
- means for controlling power output of said electric generator for charging said battery or supplying power to electrical load in said vehicle while said engine is operational;
- wherein said turbocharger has a controlled constant or variable outlet pressure by using the electric generator and battery for altitude compensation or for controlling power output, or for both altitude compensation and controlling power output.

38. An apparatus as recited claim 37, wherein driving said electric generator with said turbocharger and charging said battery with said electric generator improves volumetric efficiency and effective thermal efficiency of said internal combustion engine.

39. An energy control apparatus for a vehicle having an internal combustion engine and a battery, comprising:
- a turbocharger adapted to be coupled to said internal combustion engine;
- an electric generator adapted to be coupled to said turbocharger and driven by exhaust gas from said internal combustion engine;
- said electric generator adapted to be electrically connected to said battery; and
- means for controlling power output of said electric generator for charging said battery or supplying power to electrical load in said vehicle while said engine is operational;
- wherein said turbocharger has a controlled constant or variable outlet pressure by using said electric generator and said battery for altitude compensation or for controlling power output, or for both altitude compensation and controlling power output.

40. An apparatus as recited in claim 39, wherein driving said electric generator with said turbocharger and charging said battery with said electric generator improves volumetric efficiency and effective thermal efficiency of said internal combustion engine.

41. A hybrid electric vehicle, comprising:
- an internal combustion engine;
- an electric motor;
- a battery power supply coupled to said electric motor;
- a drivetrain configured to be coupled to said engine and said motor;
- a turbocharger coupled to said internal combustion engine; and
- an electric generator mechanically coupled to said turbocharger and electrically connected to said motor and to said battery power supply;
- wherein said electric generator is configured to charge said battery power supply from power provided by said turbocharger; and wherein said electric generator is configured to supply at least partial power to said motor from power provided by said turbocharger;

wherein said turbocharger has a controlled constant or variable outlet pressure for altitude compensation or for controlling power output, or for both altitude compensation and controlling power output.

42. A hybrid electric vehicle as recited in claim 41, further comprising means for controlling power output of said electric generator for charging said battery power supply while said engine is operation.

43. A hybrid electric vehicle as recited in claim 41, wherein charging said battery powers supply from power provided by said turbocharger improves volumetric efficiency and effective thermal efficiency of said internal combustion engine.

* * * * *